United States Patent
Yu et al.

(10) Patent No.: US 12,505,560 B2
(45) Date of Patent: Dec. 23, 2025

(54) BILATERAL ATTENTION TRANSFORMER IN MOTION-APPEARANCE NEIGHBORING SPACE FOR VIDEO OBJECT SEGMENTATION

(71) Applicant: Microsoft Technology Licensing, LLC, Redmond, WA (US)

(72) Inventors: Ye Yu, Redmond, WA (US); Gaurav Mittal, Redmond, WA (US); Mei Chen, Bellevue, WA (US); Jialin Yuan, Corvallis, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 571 days.

(21) Appl. No.: 17/932,217

(22) Filed: Sep. 14, 2022

(65) Prior Publication Data
US 2024/0020854 A1    Jan. 18, 2024

Related U.S. Application Data

(60) Provisional application No. 63/368,596, filed on Jul. 15, 2022.

(51) Int. Cl.
*G06T 7/215*  (2017.01)
*G06T 7/80*   (2017.01)
*G06V 10/26*  (2022.01)

(52) U.S. Cl.
CPC ............. *G06T 7/215* (2017.01); *G06T 7/80* (2017.01); *G06V 10/26* (2022.01)

(58) Field of Classification Search
CPC .. G06N 3/045; G06N 3/08; G06T 7/11; G06T 2207/20081; G06T 7/10; G06T 7/80; G06T 7/215; G06T 2207/20084; G06T 2207/10016; G06V 20/41; G06V 10/26; G06V 10/82; G06V 20/40; G06V 20/46; G06V 10/74; G06V 20/48; G06V 20/70; G06F 16/7837; G06F 16/532
See application file for complete search history.

(56) References Cited

U.S. PATENT DOCUMENTS 6,785,329 B1 *  8/2004  Pan ........................ G06T 7/187
                                              375/240.08
11,200,424 B2 * 12/2021  Lee ........................ G06V 20/49

OTHER PUBLICATIONS

Wang D, Li N, Zhou Y, Mu J. Bilateral attention network for semantic segmentation. IET Image Process. 2021; 15: 1607-1616 (Year : 2021).*

(Continued)

*Primary Examiner* — Courtney Joan Nelson
(74) *Attorney, Agent, or Firm* — Foley IP Law, PLLC

(57) ABSTRACT

Example solutions for video object segmentation (VOS) use a bilateral attention transformer in motion-appearance neighboring space, and perform a process that includes: receiving a video stream comprising a plurality of video frames in a sequence; receiving a first object mask for an initial video frame of the plurality of video frames; selecting a video frame of the plurality of video frames as a current query frame, the current query frame following, in the sequence, a reference frame of a reference frame set, wherein each reference frame has a corresponding object mask; using the current query frame and a video frame in the reference frame set, determining a bilateral attention; and using the bilateral attention, generating an object mask for the current query frame.

17 Claims, 12 Drawing Sheets

(56) References Cited

OTHER PUBLICATIONS

Xie, Haozhe, et al. "Efficient regional memory network for video object segmentation." Proceedings of the IEEE/CVF conference on computer vision and pattern recognition. 2021 (Year: 2021).*
"International Search Report and Written Opinion Issued in PCT Application No. PCT/US23/025092", Mailed Date: Sep. 11, 2023, 10 Pages.
Ba, et al., "Layer Normalization", In the Repository of arXiv:1607.06450v1, Jul. 21, 2016, 14 Pages.
Bhat, et al., "Learning What to Learn for Video Object Segmentation", In the Proceedings of 16th European Conference on Computer Vision, Aug. 23, 2020, pp. 777-794.
Caelles, et al., "One-Shot Video Object Segmentation", In the Proceedings of IEEE Conference on Computer Vision and Pattern Recognition, Jul. 21, 2017, pp. 221-230.
Carion, et al., "End-to-End Object Detection with Transformers", In the Proceedings of 16th European Conference on Computer Vision, vol. 1, Aug. 23, 2020, pp. 213-229.
Chen, et al., "Blazingly Fast Video Object Segmentation with Pixel-Wise Metric Learning", In the Proceedings of IEEE CVF Conference on Computer Vision and Pattern Recognition, Jun. 18, 2018, pp. 1189-1198.
Chen, et al., "State-Aware Tracker for Real-Time Video Object Segmentation", In the Proceedings of IEEE/CVF Conference on Computer Vision and Pattern Recognition, Jun. 13, 2020, pp. 9384-9393.
Cheng, et al., "Global Contrast Based Salient Region Detection", In the Journal of IEEE Transactions on Pattern Analysis and Machine Intelligence, vol. 37, Issue 3, Aug. 4, 2014, pp. 569-582.
Cheng, et al., "Rethinking Space—Time Networks with Improved Memory Coverage for Efficient Video Object Segmentation", In the Proceedings of Advance on Neural Information Processing Systems, vol. 34, Dec. 6, 2021, 14 Pages.
Cheng, et al., "SegFlow: Joint Learning for Video Object Segmentation and Optical Flow", In the Proceedings of IEEE International Conference on Computer Vision, Oct. 22, 2017, pp. 686-695.
Dosovitskiy, et al., "An Image is Worth 16×16 Words: Transformers for Image Recognition at Scale", In the Repository of arXiv:2010.11929v1, Oct. 22, 2020, 21 Pages.
Duke, et al., "Sparse Spatiotemporal Transformers for Video Object Segmentation", In the Proceedings of IEEE/CVF Conference on Computer Vision and Pattern Recognition, Jun. 20, 2021, pp. 5912-5921.
Everingham, et al., "The PASCAL Visual Object Classes (VOC) Challenge", In the International Journal of Computer Vision, vol. 88, Issue 2, Jun. 2010, 37 Pages.
Hariharan, et al., "Semantic contours from inverse detectors", In the Proceedings of International Conference on Computer Vision, Nov. 6, 2011, pp. 991-998.
He, et al., "Deep Residual Learning for Image Recognition", In the Proceedings of IEEE Conference on Computer Vision and Pattern Recognition, Jun. 27, 2016, pp. 770-778.
Hu, et al., "Learning Position and Target Consistency for Memory-based Video Object Segmentation", In the Proceedings of 2021 IEEE/CVF Conference on Computer Vision and Pattern Recognition, Jun. 20, 2021, pp. 4144-4154.
Huang, et al., "Fast Video Object Segmentation With Temporal Aggregation Network and Dynamic Template Matching", In the Proceedings of IEEE/CVF Conference on Computer Vision and Pattern Recognition, Jun. 13, 2020, pp. 8879-8889.
Khoreva, et al., "Lucid Data Dreaming for Video Object Segmentation", In the International Journal of Computer Vision, vol. 127, Issue 9, Sep. 2019, pp. 1175-1197.
Liang, et al., "Video Object Segmentation with Adaptive Feature Bank and Uncertain-Region Refinement", In the Proceedings of the Conference on Advances in Neural Information Processing Systems, vol. 33, Dec. 6, 2020, 12 Pages.

Lin, et al., "Feature Pyramid Networks for Object Detection", In the Proceedings of IEEE Conference on Computer Vision and Pattern Recognition, Jul. 21, 2017, pp. 936-944.
Lin, et al., "Microsoft COCO: Common Objects in Context", In the Proceedings of 13th European Conference on Computer Vision, vol. 5, Sep. 6, 2014, pp. 740-755.
Loshchilov, et al., "Decoupled Weight Decay Regularization", In Repository of arXiv:1711.05101v3, Jan. 4, 2019, 19 Pages.
Lu, et al., "Video Object Segmentation with Episodic Graph Memory Networks", In Proceedings of 16th European Conference on Computer Vision, vol. 3, Aug. 23, 2020, pp. 661-679.
Mao, et al., "Joint Inductive and Transductive Learning for Video Object Segmentation", In the Proceedings of 2021 IEEE/CVF International Conference on Computer Vision, Oct. 10, 2021, pp. 9670-9679.
Mayer, et al., "A Large Dataset to Train Convolutional Networks for Disparity, Optical Flow, and Scene Flow Estimation", In the Proceedings of IEEE Conference on Computer Vision and Pattern Recognition, Jun. 27, 2016, pp. 4040-4048.
Mei, et al., "TransVOS: Video Object Segmentation with Transformers", In the Repository of arXiv:2106.00588v1, Jun. 1, 2021, 11 Pages.
Nowozin, Sebastian, "Optimal Decisions from Probabilistic Models: The Intersection-over-Union Case", In the Proceedings of IEEE Conference on Computer Vision and Pattern Recognition, Jun. 23, 2014, pp. 548-555.
Oh, et al., "Video Object Segmentation Using Space-Time Memory Networks", In the Proceedings of IEEE/CVF International Conference on Computer Vision, Oct. 27, 2019, pp. 9225-9234.
Paszke, et al., "Automatic differentiation in PyTorch", In the Proceedings of 31st Conference on Neural Information Processing Systems, Dec. 4, 2017, 4 Pages.
Perazzi, et al., "A Benchmark Dataset and Evaluation Methodology for Video Object Segmentation", In the Proceedings of 2016 IEEE Conference on Computer Vision and Pattern Recognition, Jun. 27, 2016, pp. 724-732.
Perazzi, et al., "Learning Video Object Segmentation from Static Images", In the Proceedings of IEEE Conference on Computer Vision and Pattern Recognition, Jul. 21, 2017, pp. 3491-3500.
Polyak, et al., "Acceleration of Stochastic Approximation by Averaging", In the SIAM journal on control and optimization, vol. 30, Issue 4, Jul. 1992, pp. 838-855.
Pont-Tuset, et al., "The 2017 DAVIS Challenge on Video Object Segmentation", In the Repository of arXiv:1704.00675v1, Apr. 3, 2017, 4 Pages.
Ronneberger, et al., "U-Net: Convolutional Networks for Biomedical Image Segmentation", In the Proceedings of International Conference on Medical Image Computing and Computer-Assisted Intervention, Oct. 5, 2015, pp. 234-241.
Seong, et al., "Kernelized Memory Network for Video Object Segmentation", In the 16th Proceedings of European Conference on Computer Vision, vol. 22, Aug. 23, 2020, pp. 629-645.
Shi, et al., "Hierarchical Image Saliency Detection on Extended CSSD", In the Journal of IEEE Transactions on Pattern Analysis and Machine Intelligence, vol. 38, Issue 4, Aug. 6, 2015, pp. 717-729.
Teed, et al., "RAFT: Recurrent All-Pairs Field Transforms for Optical Flow", In the 16th Proceedings of European conference on computer vision, vol. 2, Aug. 23, 2020, pp. 402-419.
Tsai, et al., "Video Segmentation via Object Flow", In the Proceedings of IEEE Conference on Computer Vision and Pattern Recognition, Jun. 27, 2016, pp. 3899-3908.
Vaswani, et al., "Attention Is All You Need", In the Advances in neural information processing systems, vol. 30, Dec. 4, 2017, 11 Pages.
Voigtlaender, et al., "FEELVOS: Fast End-To-End Embedding Learning for Video Object Segmentation", In the Proceedings of 2019 IEEE/CVF Conference on Computer Vision and Pattern Recognition, Jun. 15, 2019, pp. 9481-9490.
Wang, et al., "End-to-End Video Instance Segmentation with Transformers", In the Proceedings of IEEE/CVF Conference on Computer Vision and Pattern Recognition, Jun. 20, 2021, pp. 8741-8750.

(56) References Cited

OTHER PUBLICATIONS

Wang, et al., "Fast Online Object Tracking and Segmentation: A Unifying Approach", In the Proceedings of IEEE/CVF Conference on Computer Vision and Pattern Recognition, Jun. 15, 2019, pp. 1328-1338.
Wolf, et al., "Transformers: State-of-the-Art Natural Language Processing", In Proceedings of the Conference on Empirical Methods in Natural Language Processing: System Demonstrations, Nov. 16, 2020, pp. 38-45.
Wu, et al., "Group Normalization", In the Proceedings of the 15th European Conference on Computer Vision, vol. 13, Sep. 8, 2018, pp. 3-19.
Xiao, et al., "MoNet: Deep Motion Exploitation for Video Object Segmentation", In the Proceedings of IEEE/CVF Conference on Computer Vision and Pattern Recognition, Jun. 18, 2018, pp. 1140-1148.
Xie, et al., "Efficient Regional Memory Network for Video Object Segmentation", In the Proceedings of IEEE/CVF Conference on Computer Vision and Pattern Recognition, Jun. 20, 2021, pp. 1286-1295.
Xu, et al., "Dynamic Video Segmentation Network", In the Proceedings of IEEE Conference on Computer Vision and Pattern Recognition, Jun. 18, 2018, pp. 6556-6565.
Xu, et al., "Reliable Propagation-Correction Modulation for Video Object Segmentation", In Repository of arXiv:2112.02853v1, Dec. 6, 2021, 13 Pages.
Xu, et al., "YouTube-VOS: A Large-Scale Video Object Segmentation Benchmark", In the Repository of arXiv:1809.03327v1, Sep. 6, 2018, 10 Pages.
Yang, et al., "Associating Objects with Transformers for Video Object Segmentation", In the Proceedings of Advances In Neural Information Processing Systems, vol. 34, Dec. 6, 2021, 12 Pages.
Yang, et al., "Collaborative Video Object Segmentation by Foreground-Background Integration", In the Proceedings of 16th European Conference on Computer Vision, vol. 5, Aug. 23, 2020, pp. 332-348.
Zhu, et al., "Deformable DETR: Deformable Transformers for End-to-End Object Detection", In the Repository of arXiv:2010.04159v1, Oct. 8, 2020, 12 Pages.
Yang, et al., "Collaborative Video Object Segmentation by Multi-Scale Foreground-Background Integration", In the Journal of IEEE Transactions on Pattern Analysis and Machine Intelligence, vol. 44, Issue 9, May 18, 2021, pp. 4701-4712.
Zaheer, et al., "Big Bird: Transformers for Longer Sequences", In the Proceedings of Advances in Neural Information Processing Systems, vol. 33, Dec. 6, 2020, 15 Pages.
Zhang, et al., "Learning Generative Vision Transformer with Energy-Based Latent Space for Saliency Prediction", In the Proceedings of Advances in Neural Information Processing Systems, vol. 34, Dec. 6, 2021, 16 Pages.
Yu, et al., "BATMAN: Bilateral Attention Transformer in Motion-Appearance Neighboring Space for Video Object Segmentation", In Repository of arXiv:2208.01159v1, Aug. 1, 2022, 18 Pages.

\* cited by examiner

FIG. 3
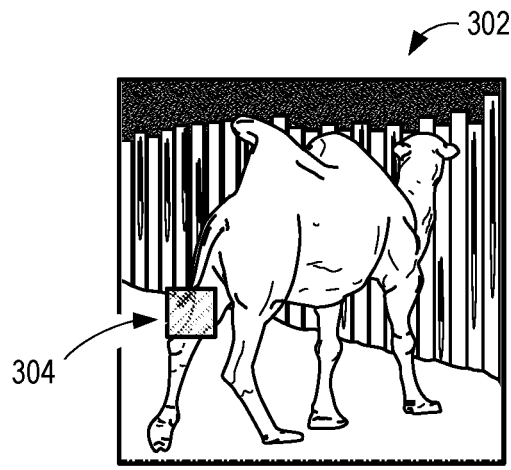
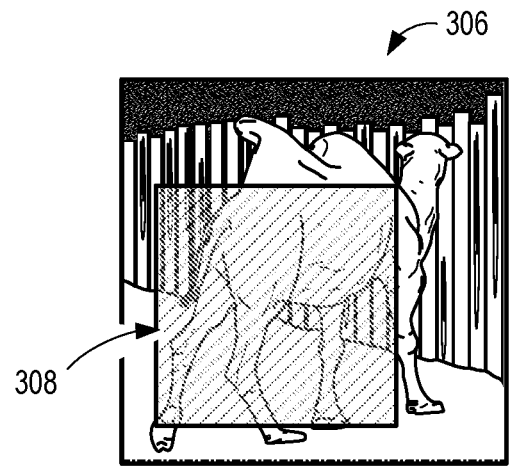
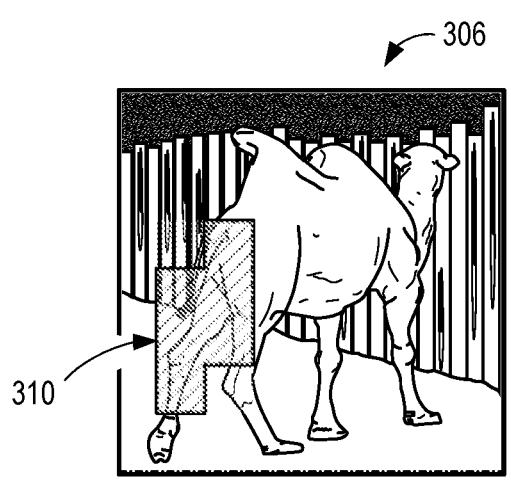

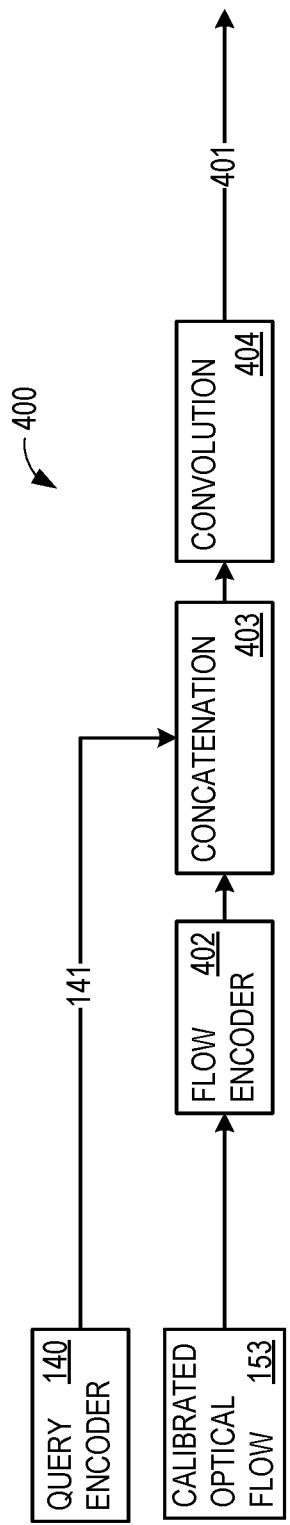

FIG. 6
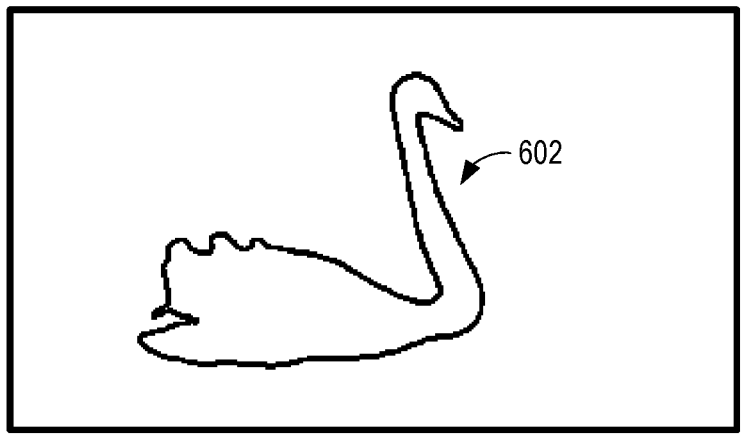
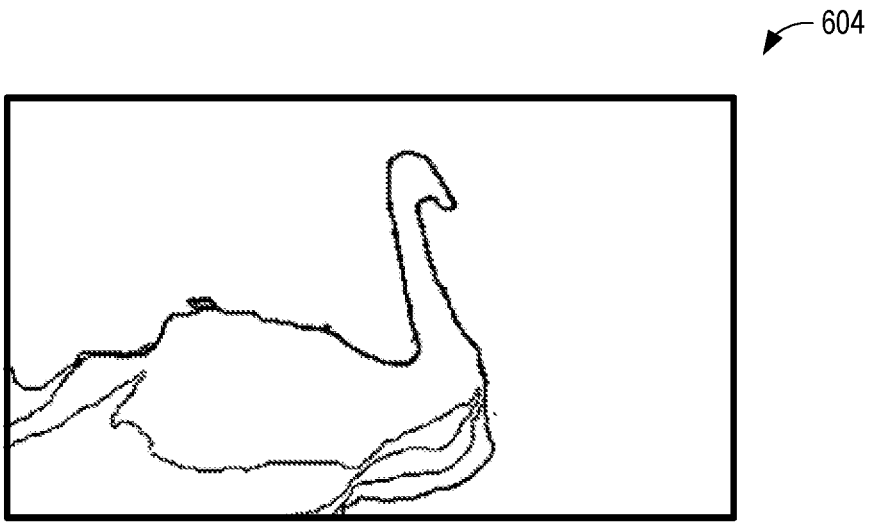
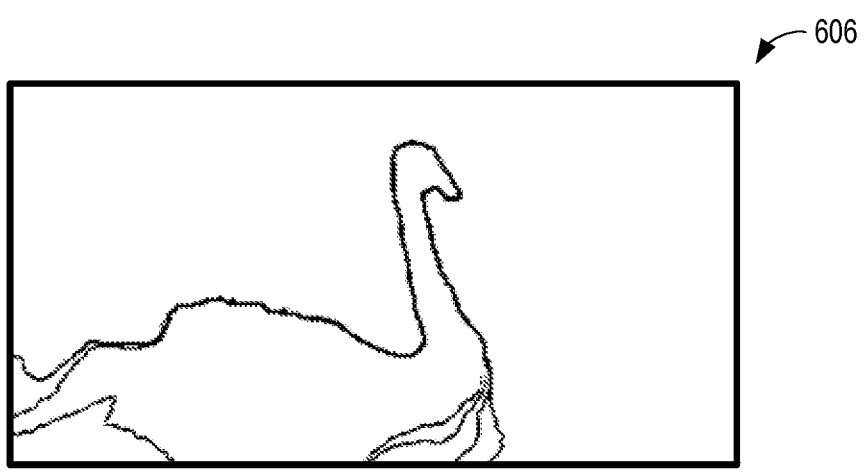

BILATERAL ATTENTION TRANSFORMER IN MOTION-APPEARANCE NEIGHBORING SPACE FOR VIDEO OBJECT SEGMENTATION

CROSS-REFERENCE TO RELATED APPLICATIONS

This application claims the benefit of U.S. Provisional Patent Application Ser. No. 63/368,596 filed on Jul. 15, 2022 and entitled "Bilateral Attention Transformer in Motion-Appearance Neighboring Space for Video Object Segmentation", which is hereby incorporated by reference in its entirety for all intents and purposes.

BACKGROUND

Video Object Segmentation (VOS) is fundamental to video understanding, with broad applications in content creation, content moderation, and autonomous driving. VOS separates foreground regions from backgrounds in video sequences, similarly to object tracking, although VOS establishes correspondence of identical objects across frames. Some examples of VOS provide for pixel-level masks rather than the bounding boxes of object tracking. Common current VOS solutions are implemented using deep neural networks.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for video object segmentation (VOS) include receiving a video stream comprising a plurality of video frames in a sequence; receiving a first object mask for an initial video frame of the plurality of video frames; selecting a video frame of the plurality of video frames as a current query frame, the current query frame following, in the sequence, a reference frame of a reference frame set, wherein each reference frame has a corresponding object mask; using the current query frame and a video frame in the reference frame set, determining a bilateral attention; and using the bilateral attention, generating an object mask for the current query frame.

BRIEF DESCRIPTION OF THE DRAWINGS

The disclosed examples are described in detail below with reference to the accompanying drawing figures listed below:

FIG. 3 illustrates an advantageous improvement in VOS performance that may be available when using examples of the architecture of FIG. 1;

FIG. 4 illustrates further detail for a component of the architecture of FIG. 1;

FIG. 6 illustrates an advantageous improvement in performance that may be available when using examples of the component of FIGS. 5A and 5B;

Corresponding reference characters indicate corresponding parts throughout the drawings.

DETAILED DESCRIPTION

Figure 1:
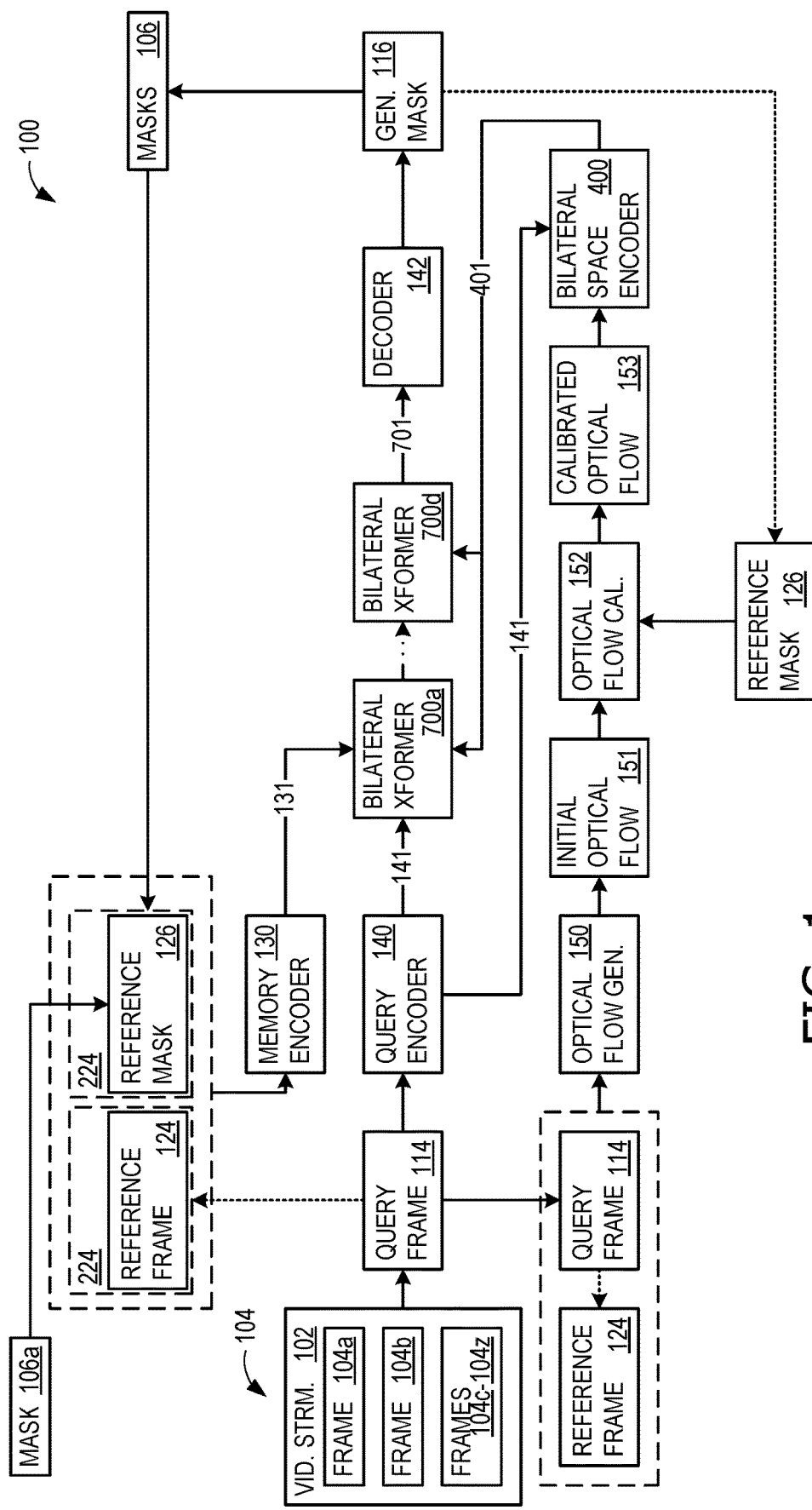
FIG. 1 illustrates an example architecture that advantageously provides for improved video object segmentation (VOS)

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Video object segmentation (VOS) is an important task in video analysis, video understanding, content creation, and content moderation. Example VOS applications track objects and segment them throughout video streams, creating masks for objects. Practical applications for VOS include: autonomous driving (e.g., awareness of object motion in the environment, prediction of object motion trajectory), highlighting objects in motion (e.g., sporting event broadcasting highlighting in real time), content moderation (censoring or blanking out inappropriate or undesirable content in live video streaming), motion analytics (e.g., body mechanics analysis), and creating augmented reality (AR) labels (AR as used here includes mixed reality and virtual reality).

Due to the absence of class-specific features in semi-supervised VOS applications, VOS models need to match features of a reference frame to that of query frames both spatially and temporally, in order to capture the class-agnostic correspondence and propagate the segmentation masks. Such approaches typically employ a global attention mechanism to establish correspondence between the full reference frame and the full query frame. This can lead to failure in distinguishing the target object(s) from the background—particularly when there are multiple objects with a similar visual appearance. Some modified approaches use a spatial local attention to mitigate resulting challenges, where the attention is only computed between each query token and its surrounding key tokens within a spatial local window. However, these modified approaches still may incorrectly segment visually similar objects in close proximity of each other.

In addition to spatial correspondence, it is important to match features temporally for optimal object segmentation across video frames. To accomplish this, some VOS approaches leverage optical flow to capture object motion, warping the memory frame mask using optical flow before performing local matching between memory and query features based on the warped mask, or simultaneously training the model for object segmentation and optical flow estimation by bi-directionally fusing feature maps from the two branches. However, these approaches are not able to perform optimally, because optical flow is typically noisy, and warping features or masks to match objects across frames may result in the accumulation of errors in both optical flow and segmentation masks along the video sequence.

In some example solutions disclosed herein for video object segmentation (VOS), the solutions use a bilateral attention transformer in motion-appearance neighboring space, and perform a process that includes: receiving a video stream comprising a plurality of video frames in a sequence; receiving a first object mask for an initial video frame of the plurality of video frames; selecting a video frame of the plurality of video frames as a current query frame, the current query frame following, in the sequence, a reference frame of a reference frame set, wherein each reference frame has a corresponding object mask; using the current query frame and a video frame in the reference frame set, determining a bilateral attention; and using the bilateral attention, generating an object mask for the current query frame.

In some example solutions disclosed herein, the solutions target objects in each frame of an entire video sequence of query frames, given their segmentation masks in the initial reference video frame. In disclosed examples, an initial frame is provided, along with an object segmentation mask for a given object in the frame, and the task is to generate an object segmentation mask for all subsequent video frames of the video stream in which the object appears. The task is class-agnostic because there is no class annotation for the object to be segmented in either training or testing.

A challenge in semi-supervised VOS tasks is how to propagate the mask from the initial reference video frame to all of the subsequent query frames in the remainder of the video stream, or sequence of video frames, without any class annotation. This challenge is addressed in some example solutions disclosed herein, by leveraging a bilateral space. Bilateral space takes into consideration both appearance and motion. The pixel color information, red, green, blue ("RGB"), provides the appearance information, and optical flow provides the motion information. Optical flow indicates pixel motion of an object from one video frame to a subsequent video frame.

In some example solutions disclosed herein, the solutions provide a bilateral attention module that computes the local attention map between the query frame and memory frames with both motion and appearance in consideration to provide an improved semi-supervised VOS solution. In some example solutions disclosed herein, the solutions adaptively compute a local attention based on one or more of the tokens' spatial distance from each other, appearance similarity, and optical flow smoothness. Since optical flow for fast-moving objects may have poorly-defined edges and significant noise, optical flow calibration leverages mask information from a prior memory frame, from which a mask has already been generated, to smooth the optical flow for the masked object in the current frame, while reducing noise at the object boundary.

Example solutions disclosed herein improve the operations of computing devices, for some example, improve the accuracy and/or speed of VOS, at least by generating an object mask for a current query frame using bilateral attention. Bilateral attention computes attention between query and memory features in the bilateral space of motion and appearance, and improves the correspondence matching by adaptively focusing on relevant object features while reducing the noise from the background. Optical flow calibration fuses the object segmentation mask and the initial optical flow estimation to smooth the optical flow and reduce noise at the object boundary.

FIG. 1 illustrates an example computing platform 110 that advantageously provides for improved VOS for a video stream 102. Computing platform 110 implements an architecture 100 that uses a VOS controller 112 to perform operations described herein. The video stream 102 has a plurality of video frames 104. Computing platform 110 receives, as input, video stream 102 and an object mask 106a for an initial video frame 104a. Architecture 100 produces a series of object masks 106 that each corresponds to a video frame of plurality of video frames 104 that follow initial video frame 104a—such as video frame 104b and additional video frames 104c-104z. Each object mask in the series of object masks 106 corresponds to a common object that appears within video stream 102. A common object may be an object that persists across multiple video frames of video stream 102, for example.

Some examples of architecture 100 operate in real-time, such that object masks 106 are completed within a broadcast delay period and are thus available to be broadcast contemporaneously with video stream 102. In some example solutions disclosed herein, architecture 100 may be operated and deployed in customer premises such as internet of things (IoT) and edge devices. Multiple additional practical applications exist for architecture 100. For example, architecture 100 may be deployed in self-driving vehicles, and/or autonomous vehicles, used for targeted content replacement, content moderation, and object labeling (e.g., for AR and/or generating training data for machine learning (ML) applications). Some examples may be used for content moderation in the context of responsible AI. In some examples, the VOS output (e.g., the object masks) may be used as input for other content enhancement techniques, such as techniques that rely upon detecting motion of objects between video frames.

VOS controller 112 selects a query frame 114 from video stream 102, starting with video frame 104b, and generates a series of object masks 116. Each object mask 116 is added to object masks 106, which initially includes only object mask 106a, and accumulates objects masks for the remainder of video stream 102. As each query frame 114 has its corresponding generated object mask 116 produced, the query frame 114 is added to a reference frame set 224 as the newest reference frame 124. Similarly, each new generated object mask 116 is added to a reference mask set 226 as the newest reference mask 126, in addition to being added to the growing series of object masks 106. Reference frame 124 and reference mask 126 are provided to a memory encoder 130 that extracts frame-level features and outputs a memory encoding 131.

Query frame 114 is provided to a query encoder 140 that extracts frame-level features and outputs a query encoding 141. Query frame 114 is also provides to an optical flow generator 150, along with the newest reference frame 124 (e.g., the immediately prior video frame, in some examples), which outputs an initial optical flow 151. Initial optical flow 151 is provided to optical flow calibration 152, along with the newest reference mask 126 (e.g., the object mask for the immediately prior video frame, in some examples). Optical flow calibration 152 outputs calibrated optical flow 153, which is provided to a bilateral space encoder 400, along with query encoding 141.

Bilateral space encoder 400 outputs a bilateral space encoding 401, which is provided to a series of bilateral transformers 700. Bilateral transformers 700a and transformer 700d are shown, each an example of bilateral transformer 700, although it should be understood that a different number of bilateral transformers 700 may be used. The series of bilateral transformers 700 outputs a bilateral transformation 701 that is decoded by a decoder 142.

VOS controller 112 then repeatedly selects the next query frame 114 from video stream 102 until an object mask 116 is generated for the remaining frames of video stream 102. Bilateral space encoder 400 is described in additional detail in relation to FIG. 4. Optical flow calibration 152 is described in additional detail in relation to FIGS. 5A and 5B. Bilateral transformer 700 is described in additional detail in relation to FIG. 7.

Figure 2A:
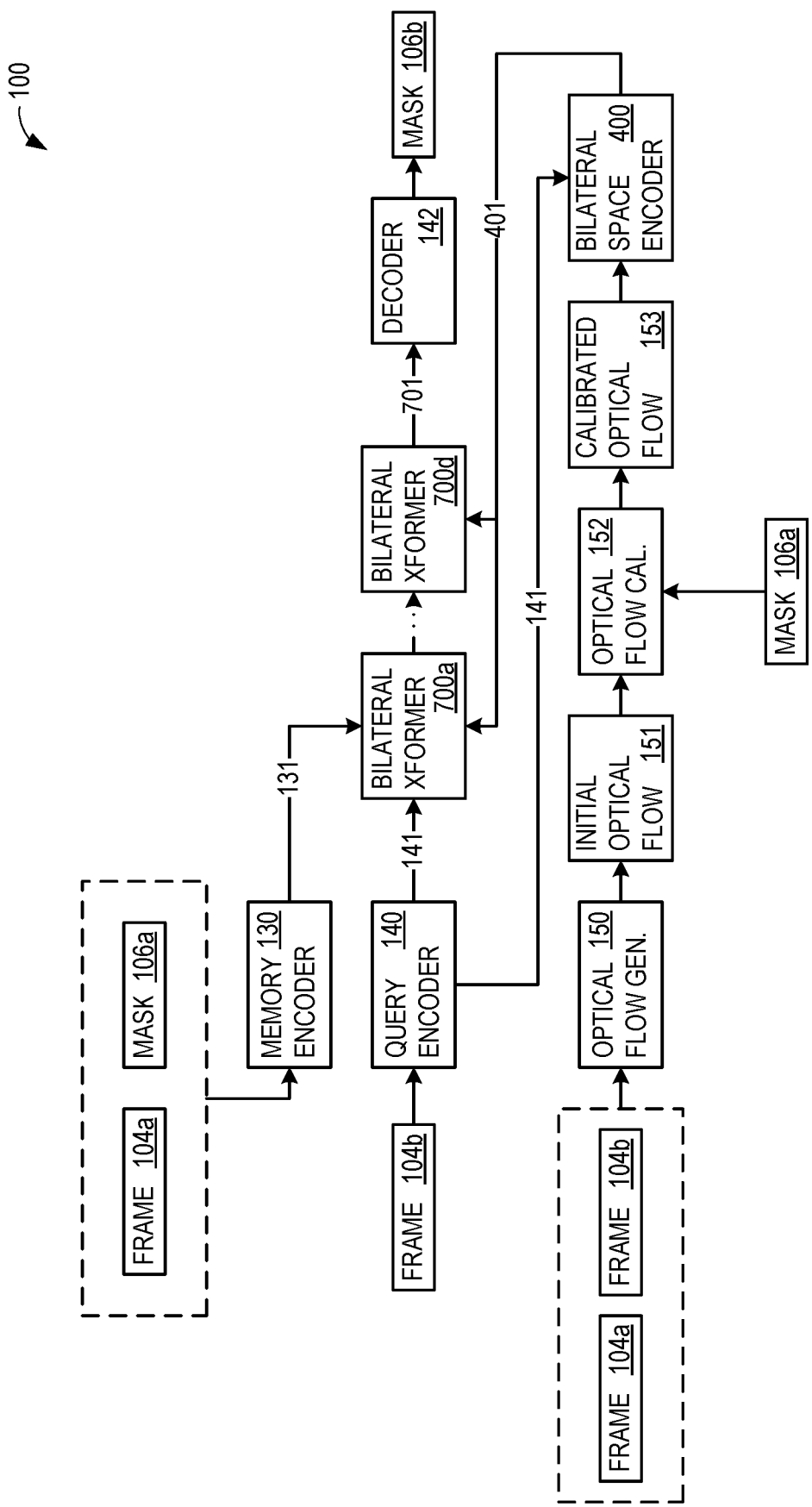
FIG. 2A illustrates an initial condition that may be encountered when using examples of the architecture of FIG. 1.
Figure 2B:
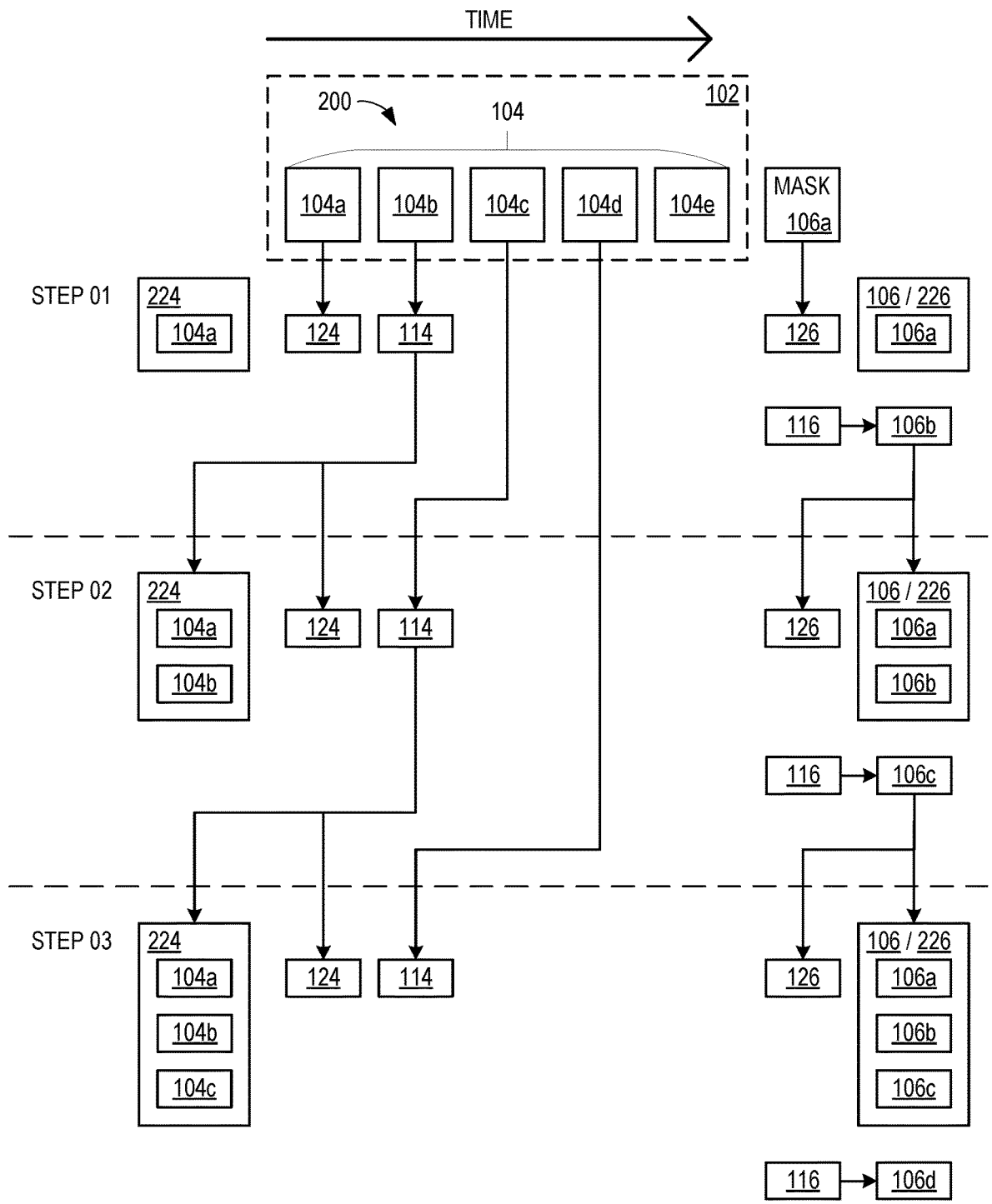
FIG. 2B illustrates detail regarding a sequence of video frames as examples of the architecture of FIG. 1 progress past the initial condition show in FIG. 2A.

FIG. 2A illustrates initial setup of architecture 100, and FIG. 2B illustrates data flow through the roles of query frame 114, reference frame 124, generated object mask 116, and reference mask 126. A plurality of video frames 104 is shown in a sequence 200, in which each video frame follows another in time.

As shown in FIG. 2A, reference frame 124 is initially video frame 104a, query frame 114 is initially video frame 104b, and reference mask 126 is initially object mask 106a. The first generated object mask 116 is object mask 106b for video frame 104b (i.e., object mask 106b corresponds to video frame 104b). This is also shown in FIG. 2B, at stage 201, which further indicates that reference frame set 224 initially includes only video frame 104a, and reference mask set 226 and object masks 106 initially includes only object mask 106a. Stage 201 generates generated object mask 116, which is currently object mask 106b.

At the completion of stage 201, the video frame in query frame 114 (at this point, video frame 104b) is added to reference frame set 224, and generated object mask 116 (at this point, object mask 106b) is added to reference mask set 226 and object masks 106. At stage 202, reference frame 124 becomes video frame 104b, query frame 114 becomes video frame 104c, and reference mask 126 becomes object mask 106b. The next generated object mask 116 is object mask 106c for video frame 104c.

At the completion of stage 202, the video frame in query frame 114 (at this point, video frame 104c) is added to reference frame set 224, and generated object mask 116 (at this point, object mask 106c) is added to reference mask set 226 and object masks 106. At stage 203, reference frame 124 becomes video frame 104c, query frame 114 becomes video frame 104d, and reference mask 126 becomes object mask 106c. The next generated object mask 116 is object mask 106d for video frame 104d. Video frame 104e will be the next query frame 114. This process continues until the end of video stream 102, when plurality of video frames 104 is exhausted (or some other stopping criteria is encountered).

FIG. 3 illustrates an advantageous improvement in VOS performance that may be available when using examples of architecture 100, specifically the improvement of bilateral attention over spatial local attention. Video frame 302 is a query frame. A token 304 is used to compute a spatial local attention of a set 308 of neighboring tokens in a memory frame 306 (a prior video frame, for example at t−1, when video frame 302 is at t).

The subject of video frames 302 and 306 is an animal that is walking. The most readily-apparent motion, from the perspective shown in video frames 302 and 306, is the hind legs. A set 310 of the most relevant tokens in memory frame 306 is also shown. Set 310 is determined by distance, which is the distance in bilateral space, and is used for cross attention computation. As can be seen in FIG. 3, set 310 is more tightly focused on the portion of the animal associated with movement than is set 308. This tighter focus provides an improvement by reducing noise and the number of tokens necessary for processing, and providing tighter precision.

FIG. 4 illustrates further detail for bilateral space encoder 400. A flow encoder 402 encodes calibrated optical flow 153, and the result is concatenated with query encoding 141 by a concatenator 403. This is subject to 1×1 convolution by convolution 404. The output of bilateral space encoder 400 is a token of the same size (dimensions) as query encoding 141. For example, the output of query encoder 140 may be 32×32 tokens, but each token may have multiple channels. The output of bilateral space encoder 400, in this example, is 32×32, but only a single channel (e.g., a scalar).

For every set of tokens in the current frame, there will be an equal number of tokens in the bilateral space. The bilateral space tokens represent how different the current frame tokens and reference frame tokens are in the bilateral space. That is, if the bilateral space tokens in the current frame and the bilateral space tokens in the reference frames are close (or distant) in value, the tokens in the current frame may be considered to be close (or distant) in bilateral space. This result is used by bilateral transformer 700, which is shown in further detail in FIG. 7.

Figure 5A:
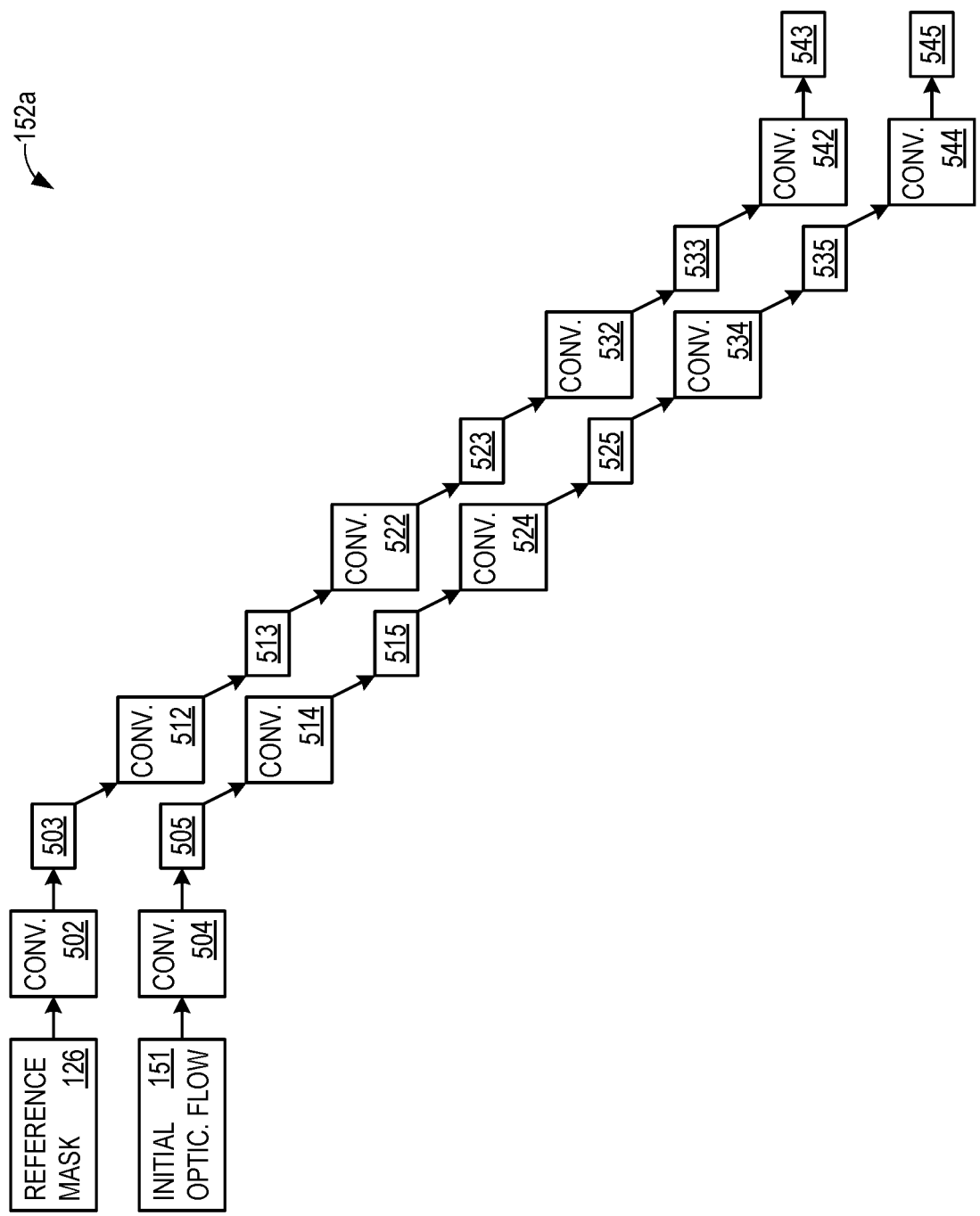
FIGS. 5A and 5B illustrate further detail for optical calibration as performed by examples of the architecture of FIG. 1.
Figure 5B:
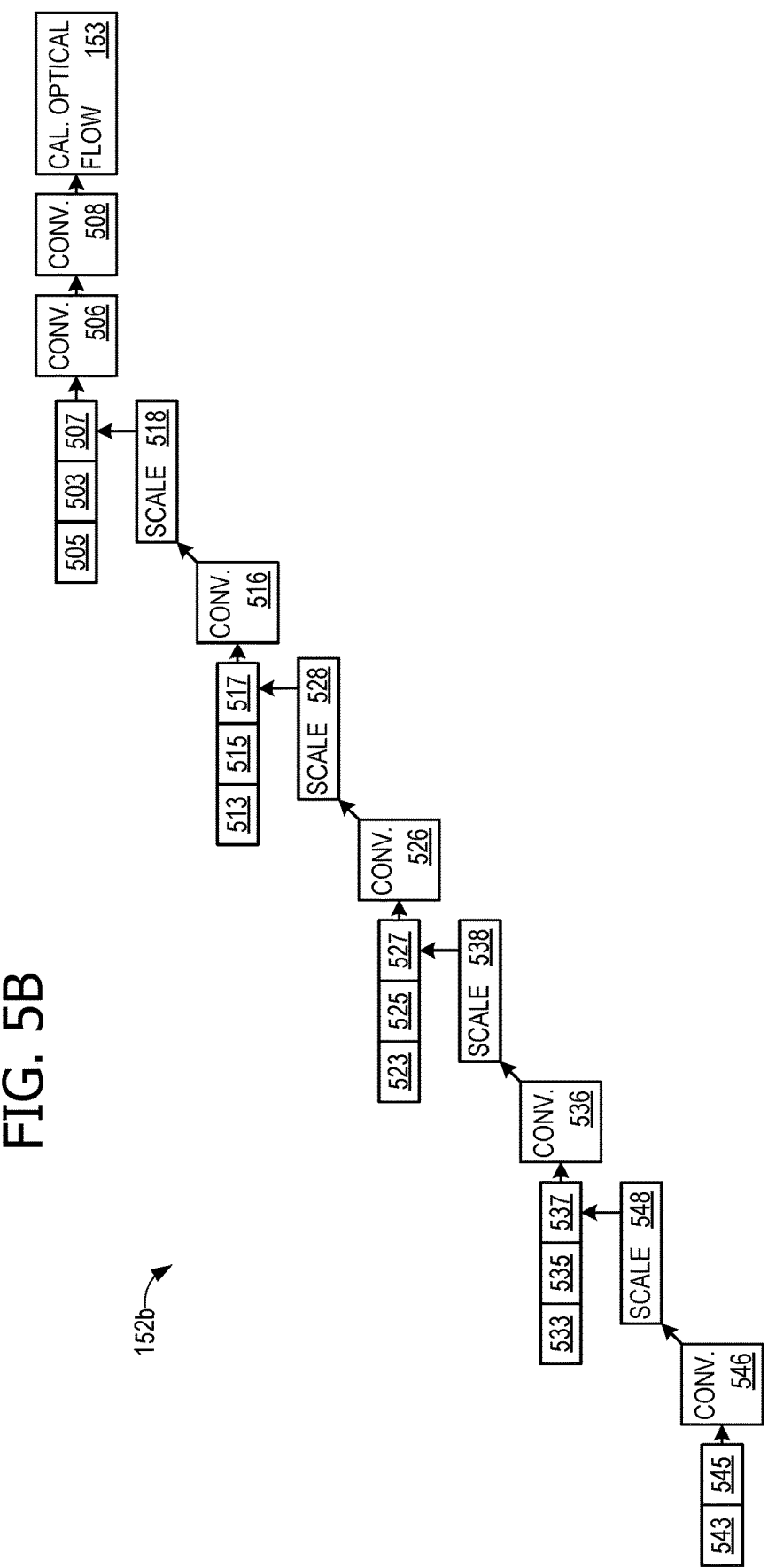

FIGS. 5A and 5B illustrate further detail for the optical flow calibration 152, shown as a first portion 152a in FIG. 5A, and a second portion 152b in FIG. 5B. In an optical flow, the value of each pixel is a two-dimensional (2D) vector representing pixel motion from frame to frame. Optical flow estimation tends to have significant noise for objects with large motion and in texture-less areas.

Reference mask 126, which is the object mask for the prior frame (e.g., the immediately prior, t−1 frame), is leveraged to improve the optical flow. Optical flow calibration 152 fuses reference mask 126 and initial optical flow 151 in a network to smooth optical flow within the detected object and reduce noise at the object boundary. To accomplish this, optical flow calibration 152 employs a convolutional neural network (CNN), similar to U-Net, with 11-layers. Optical flow calibration 152 is trained using a loss function of a mean square error (MSE) between an input initial optical flow estimate and a final output optical flow that refined across multiple frames.

In an example shown starting in FIG. 5A, reference mask 126 is passed through a 7×7 convolution network 502 to produce intermediate result 503, and initial optical flow 151 is similarly passed through a 7×7 convolution network 504 to produce intermediate result 505. Intermediate result 503 and 505 are subject to a 3×3, stride=2 convolution network 512 to produce intermediate result 513, and a 3×3, stride=2 convolution network 514 to produce intermediate result 515, respectively. The 3×3, stride=2 convolutions are repeated 3 more times for each channel: Intermediate result 513 is passed through convolution network 522 to produce intermediate result 523, intermediate result 523 is passed through convolution 532 to produce intermediate result 533, and intermediate result 533 is passed through convolution network 542 to produce intermediate result 543. Similarly, intermediate result 515 is passed through convolution 524 to produce intermediate result 525, intermediate result 525 is passed through convolution 534 to produce intermediate result 535, and intermediate result 535 is passed through convolution 544 to produce intermediate result 545.

Continuing with FIG. 5B, intermediate results 533 and 535 are concatenated, and the result is subject to a 3×3 convolution network 546, which is scaled up 2×2 by scale 548 into intermediate result 537. Intermediate results 533 and 535 are concatenated with intermediate result 537, and the result is subject to a 3×3 convolution 536, which is scaled up 2×2 by scale 538 into intermediate result 527. Intermediate results 523 and 525 are concatenated with intermediate result 527, and the result is subject to a 3×3 convolution network 526, which is scaled up 2×2 by scale 528 into intermediate result 517. Intermediate results 513 and 515 are concatenated with intermediate result 517, and the result is subject to a 3×3 convolution network 516, which is scaled up 2×2 by scale 518 into intermediate result 507.

Intermediate results 503 and 505 are concatenated with intermediate result 507, and the result is subject to a 3×3 convolution network 506, the output of which is subject to a 3×3 convolution network 508, thereby producing calibrated optical flow 153.

FIG. 6 illustrates an advantageous improvement in performance that may be available when using some examples of the disclosed optical flow calibration 152. An object mask 602 is shown, along with a line drawing of an initial optical flow 604 and a line drawing of a calibrated optical flow 606. Optical flows are generally color images with color hue and intensity indicating pixel values, and the representations in FIG. 6 are rendered as contours. As can be seen in FIG. 6, calibrated optical flow 606 is smoother, with fewer contour lines, indicating sharper edges.

Figure 7:
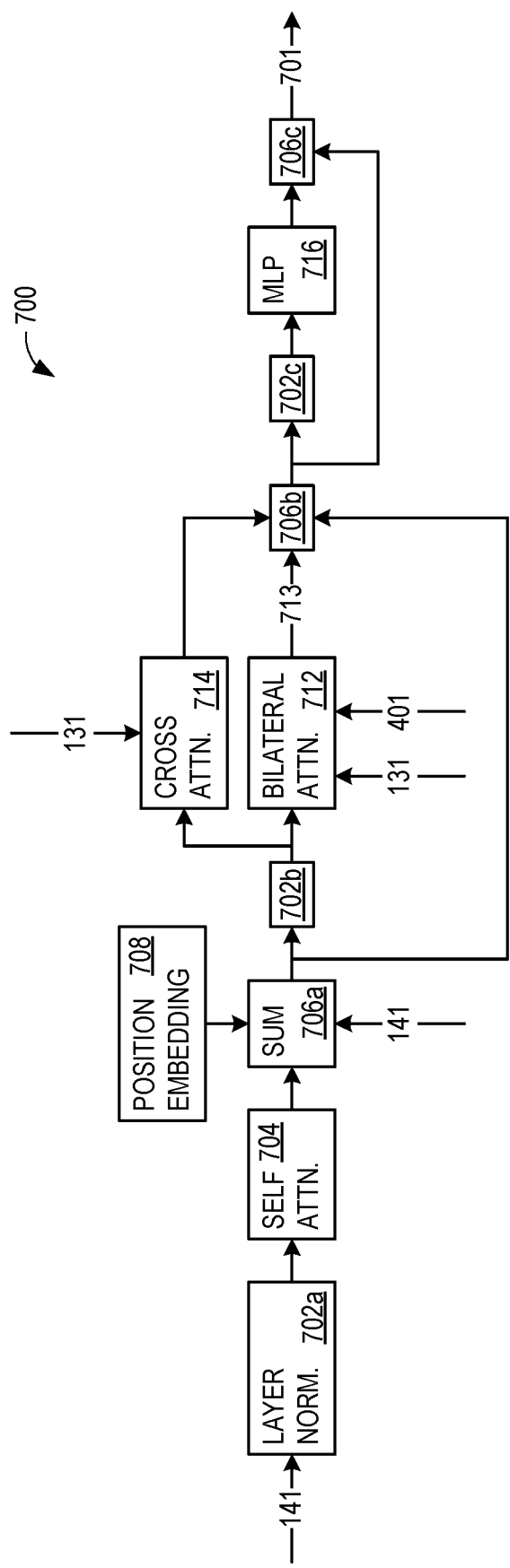
FIG. 7 illustrates further detail for components of the architecture of FIG. 1.

FIG. 7 illustrates an example of bilateral transformer 700. Query encoding 141 is provided to a layer normalization 702a and a self-attention network 704. The output of self-attention network 704 is combined, using a sum 706a, with query encoding 141 and a sinusoidal position embedding 708 that encodes the tokens' relative positions. The output of sum 706a is subject to another layer normalization 702b, the output of which is provided to a bilateral attention network 712 and a cross-attention network 714.

Bilateral attention network 712 also intakes memory encoding 131 and bilateral space encoding 401, and outputs a bilateral attention 713. Cross-attention network 714 also intakes memory encoding 131. Bilateral attention 713 and the output of cross-attention network 714 are combined using another sum 706b, with the output of the upstream sum 706a. The output of sum 706b is provided to another layer normalization 702c, which is provided to a multilayer perceptron (MLP) 716. The output of MLP 716 is combined with the output of sum 706b using another sum 706c to produce bilateral transformation 701.

Referring now to FIGS. 1, 4, and 7 together, the operation of embodiments of architecture 100 is further described. It should be noted that some features described above, and in this further description, may not be necessary for functionality of all example solutions disclosed herein. Frame-level features are extracted through memory encoder 130 and query encoder 140 to capture the target object features for establishing correspondence in the later transformer layers. Initial optical flow 151 is computed between query frame 114 and its previous frame (reference frame 124) through a pre-trained FlowNet. The object mask from the previous frame (e.g., reference mask 126) is provided, together with initial optical flow 151, to optical flow calibration 152. Optical flow calibration 152 improves the optical flow, as noted above. Calibrated optical flow 153 and query frame 114 features are encoded into bilateral space encoding 401. Some examples use tokens in bilateral space encoding 401.

At least one bilateral transformer 700 block aggregates spatial-temporal information among reference frame 124 and query frame 114 at the pixel-level, based on bilateral space encoding 401. In some example solutions disclosed herein, multiple bilateral transformer 700 blocks are used in sequence to improve the encoding. FIG. 1 shows two, although some example solutions may use a different number, such as four. After bilateral transformer 700 block aggregates the spatial-temporal information, decoder 142 predicts object mask 116 for query frame 114.

In each bilateral transformer 700 block, query frame 114 features first go through self-attention to aggregate the information within query frame 114, followed by adding sinusoidal position embedding 708 encoding the tokens' relative positions. Cross-attention and bilateral attention are applied with the reference frame features and the results are added together. Layer normalization is inserted before and after each attention module. A two-layer feed-forward MLP block is applied before providing the output to the next layer.

Bilateral space encoding 401 is used to index each position (token) of query frame 114 features in the bilateral space. Calibrated optical flow 153 is encoded using flow encoder 402. The optical flow encoding and query encoding 141 from query encoder 140 are concatenated in the channel dimension, and a 1×1 convolutional layer is used to project the concatenation to a 1-dimensional space (in channel) where each position (token) has a single scalar coordinate for the bilateral space of motion and appearance.

Bilateral attention is used to aggregate spatial-temporal information between the query tokens and neighboring key tokens from the reference frames in bilateral space. Unlike global cross-attention, in which each query token computes attention with all key tokens from the reference frames, the disclosed bilateral attention adaptively selects the most relevant key tokens for each query token based on the bilateral space encoding 401. This is illustrated in FIG. 3, where set 310 of the most relevant tokens is more tightly focused than set 308 of neighboring tokens.

To formulate bilateral space encoding 401, some example solutions disclosed herein define query tokens Q, key tokens K, and value embedding tokens V as:

$$Q, K, V \in \mathbb{R}^{HW \times C} \qquad \text{Eq. (1)}$$

where Q is from query frame 114 and K and V are aggregated from multiple reference frames. H, W, and C represent the height, width, and channel dimensions of the tokens, respectively.

In some example solutions disclosed herein, bilateral attention 713 defined as:

$$BiAttn(Q, K, V) = \text{softmax}\left(\frac{QK^T M}{\sqrt{C}}\right) V \qquad \text{Eq. (2)}$$

where M is the bilateral space binary mask that defines the attention scope for each query token, and $$M \in [0,1] \mathbb{R}^{HW \times HW} \qquad \text{Eq. (3)}$$

For each query token $Q_{h,w}$ at the position (h,w), the corresponding bilateral space binary mask $M_{h,w}$ is defined, in some example solutions disclosed herein, as:

$$M_{h,w}(i, j, E) = \begin{cases} 1 & \text{if } |i - h| \leq W_d \text{ and } |j - w| \leq W_d \text{ and} \\ & \left|\arg \text{sort}_{W_d}(E_{h,w}) - \arg \text{sort}_{W_d}(E_{i,j})\right| \leq W_b \\ 0 & \text{otherwise} \end{cases} \qquad \text{Eq. (4)}$$

where (i,j) is the position for each key token, $E \in \mathbb{R}^{HW \times 1}$ is the bilateral space encoding of the queries, and $W_d$ and $W_b$ are predefined local windows in spatial and bilateral domains, respectively. The term $\text{argsort}_{w_d}(E_{i,j})$ denotes sorting all bilateral space encoding E within the spatial local window $W_d$ and finding the corresponding index at position (i,j).

In some example solutions disclosed herein, to train the bilateral space encoding E by stochastic gradient descent directly, rather than computing $QK^TM$ as shown in Eq. (2), $QK^T+E$ is computed if M=1, while computing $QK^T-L$ if M=0, where $L \in \mathbb{R}$ is a large positive number. This approximates $QK^TM$ in Eq. (2) after using softmax.

Eq. (4) shows that for each query token, the attention is computed with another key token only if the query token and the other query token are close to each other spatially and also share similar bilateral space encoding (i.e., they have similar motion and appearance).

In some example solutions disclosed herein, the bilateral attention is implemented via a multi-headed formulation where queries, keys, and values are linearly projected multiple times with different learnable projections. The multiple heads of bilateral attention are subjected to a feedforward in parallel followed by concatenation and a linear projection. The multi-head bilateral attention, when used, is defined as:

$$\text{MultiHead}GHU(Q,K,V) = \text{Concat}(\text{head}_1, \ldots, \text{head}_h)W^O \quad \text{Eq. (5)}$$

where $$\text{head}_i = \text{BiAttn}(QW_i^Q, KW_i^K, VW_i^V) \quad \text{Eq. (6)}$$

and where the projection matrices are $W_i^Q \in \mathbb{R}^{C \times d_{hidden}}$, $W_i^K \in \mathbb{R}^{C \times d_{hidden}}$, $W_i^V \in \mathbb{R}^{C \times d_{hidden}}$, and $\mathbb{R}^{C \times C}$.

Figure 8:
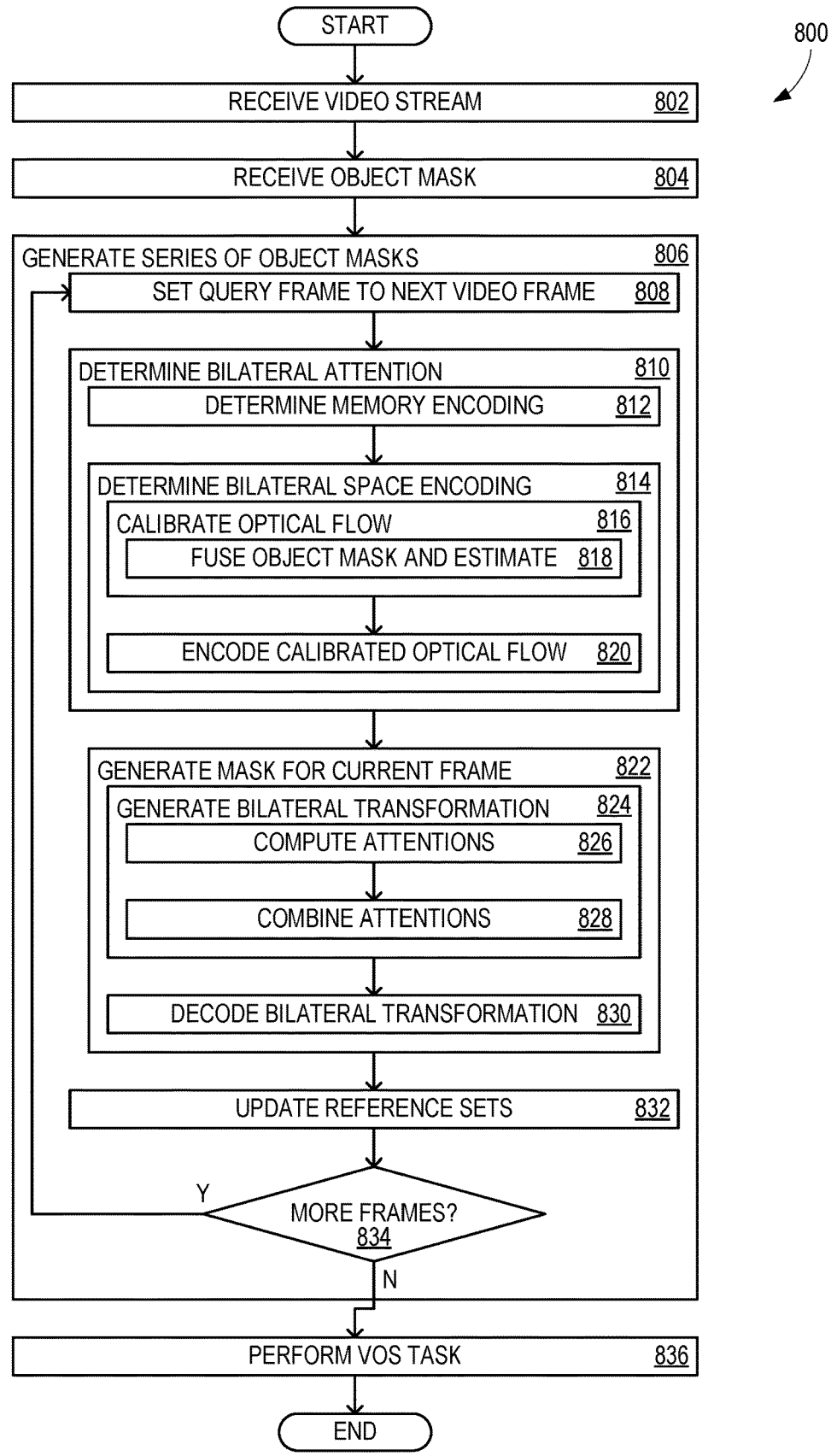
FIG. 8 shows a flowchart illustrating exemplary operations that may be performed using examples of the architecture of FIG. 1.

FIG. 8 shows a flowchart 800 illustrating exemplary operations that may be performed by architecture 100. In some example solutions disclosed herein, operations described for flowchart 800 are performed by computing device 1000 of FIG. 10. Flowchart 800 commences with architecture 100 receiving video stream 102 comprising plurality of video frames 104 in sequence 200, in operation 802. In operation 804, architecture 100 receives object mask 106a for video frame 104a (an initial video frame of plurality of video frames 104).

Operation 806 generates series of object masks 106 corresponding to video frames of plurality of video frames 104, and is performed using operation 808 through decision operation 834. Each object mask in series of object masks 106 corresponds to a common object that appears within video stream 102. Operation 808 sets a video frame of plurality of video frames 104, starting with the second video frame, video frame 104b, and proceeding in turn through plurality of video frames 104. That is, operation 808 selects a video frame of plurality of video frames 104 as current query frame 114, current query frame 114 following, in sequence 200, reference frame 124. Each reference frame of reference frame set 224 has a corresponding object mask in object masks 106 and reference mask set 226.

Operation 810 determines bilateral attention 713 using current query frame 114 and a video frame in reference frame set 224 (e.g., the most recent reference frame 124), and is performed using operations 812-820. Bilateral attention 713 comprises a function of query tokens, key tokens, value tokens, and the bilateral space binary mask. The bilateral space binary mask defines an attention scope for each query token. Operation 812 determines memory encoding 131 using reference frame set 224.

Operation 814 determines bilateral space encoding 401 using calibrated optical flow 153 and query features in query encoding 141, and is performed using operation 816-820. Operation 816 generates calibrated optical flow 153 using operation 818, which fuses reference mask 126 (corresponding to reference frame 124) with initial optical flow 151. Initial optical flow 151 is the optical flow estimation between current query frame 114 and reference frame 124 (e.g., the video frame preceding current query frame 114 in sequence 200). Operation 820 encodes calibrated optical flow 153 with flow encoder 402.

Operation 822 generates object mask 116 for current query frame 114 using bilateral attention 713, with operations 824-830. Operation 824 generates bilateral transformation 701, and includes operation 826-828. Operation 826 computes attention between query features and memory features in a bilateral space of motion and appearance. Operation 828 combines bilateral attention 713 and a cross-attention that is based on query encoding 141 and memory encoding 131. Operation 830 decodes bilateral transformation 701.

After generating object mask 116 for current query frame 114, operation 832 adds current query frame 114 to reference frame set 224. Decision operation 834 determines whether video stream 102 has more frames for which an object mask is to be generated. If so, flowchart 800 returns to operation 808, which now sets a video frame, after what had been current query frame 114 in sequence 200, as the subsequent (next) query frame 114. Otherwise, operation 836 performs a VOS task for video stream 102 using the series of object masks 106. In some example solutions disclosed herein, the VOS task is selected from the list consisting of: targeted content replacement, content moderation, and object labeling.

Figure 9:
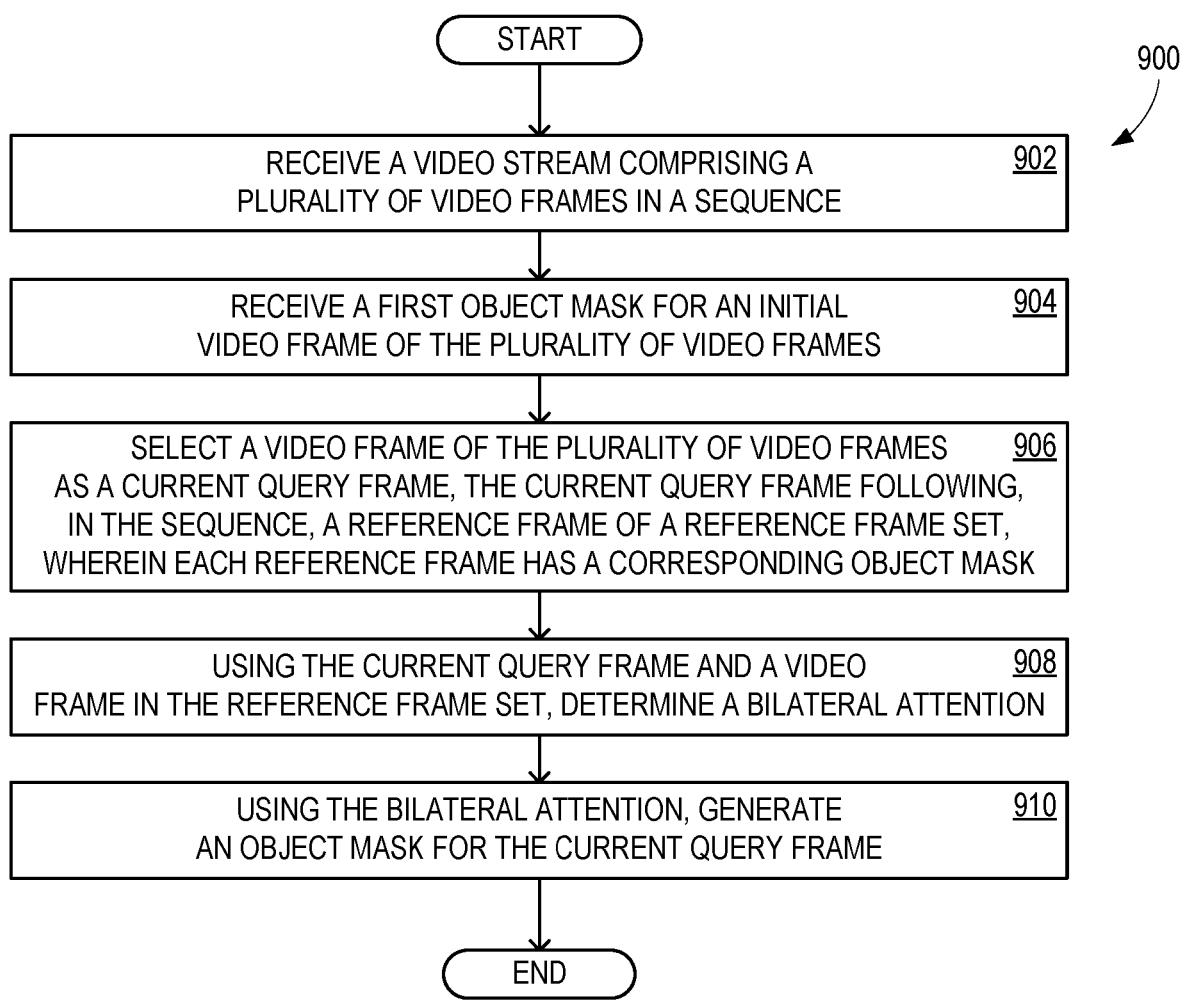
FIG. 9 shows another flowchart illustrating exemplary operations that may be performed using examples of the architecture of FIG. 1.

FIG. 9 shows a flowchart 900 illustrating exemplary operations that may be performed by architecture 100. In some example solutions disclosed herein, operations described for flowchart 900 are performed by computing device 1000 of FIG. 10. Flowchart 900 commences with operation 902, which includes receiving a video stream comprising a plurality of video frames in a sequence. Operation 904 includes receiving a first object mask for an initial video frame of the plurality of video frames.

Operation 906 includes selecting a video frame of the plurality of video frames as a current query frame, the current query frame following, in the sequence, a reference frame of a reference frame set, wherein each reference frame has a corresponding object mask. Operation 908 includes, using the current query frame and a video frame in the reference frame set, determining a bilateral attention. Operation 9104 includes, using the bilateral attention, generating an object mask for the current query frame.

Additional Examples

An example system comprises: a processor; and a computer-readable medium storing instructions that are operative upon execution by the processor to: receive a video stream comprising a plurality of video frames in a sequence; receive a first object mask for an initial video frame of the plurality of video frames; select a video frame of the plurality of video frames as a current query frame, the current query frame following, in the sequence, a reference frame of a reference frame set, wherein each reference frame has a corresponding object mask; using the current query frame and a video frame in the reference frame set, determine a bilateral attention; and using the bilateral attention, generate an object mask for the current query frame.

An example computerized method comprises: receiving a video stream comprising a plurality of video frames in a sequence; receiving a first object mask for an initial video frame of the plurality of video frames; selecting a video frame of the plurality of video frames as a current query frame, the current query frame following, in the sequence, a reference frame of a reference frame set, wherein each reference frame has a corresponding object mask; using the current query frame and a video frame in the reference frame set, determining a bilateral attention; and using the bilateral attention, generating an object mask for the current query frame.

One or more example computer storage devices has computer-executable instructions stored thereon, which, on execution by a computer, cause the computer to perform operations comprising: receiving a video stream comprising a plurality of video frames in a sequence; receiving a first object mask for an initial video frame of the plurality of video frames; selecting a video frame of the plurality of video frames as a current query frame, the current query frame following, in the sequence, a reference frame of a reference frame set, wherein each reference frame has a corresponding object mask; using the current query frame and a video frame in the reference frame set, determining a bilateral attention; and using the bilateral attention, generating an object mask for the current query frame.

Alternatively, or in addition to the other examples described herein, examples include any combination of the following:

- generating a series of object masks corresponding to video frames of the plurality of video frames, wherein each object mask in the series of object masks corresponds to a common object that appears within the video stream;
- generating the series of object masks comprises setting, in turn, a video frame of the plurality of video frames, after the initial video frame in the sequence, as the current query frame;
- generating the series of object masks comprises, after generating the object mask for the current query frame, adding the current query frame to the reference frame set;
- generating the series of object masks comprises setting a video frame of the plurality of video frames, after the current query frame in the sequence, as a subsequent query frame;
- using the series of object masks, performing, for the video stream, a VOS task selected from the list consisting of: targeted content replacement, content moderation, and object labeling;
- determining the bilateral attention comprises, using a calibrated optical flow and query features, determining a bilateral space encoding;
- determining the bilateral attention comprises, using the reference frame set, determining a memory encoding;
- generating the calibrated optical flow;
- generating the calibrated optical flow comprises fusing an object mask corresponding to a video frame preceding the current query frame with an initial optical flow estimation between the current query frame and the video frame preceding the current query frame;
- computing attention between query features and memory features in a bilateral space of motion and appearance;
- the bilateral attention comprises a function of query tokens, key tokens, value tokens, and a bilateral space binary mask;
- the bilateral space binary mask defines an attention scope for each query token;
- determining the bilateral space encoding comprises encoding the calibrated optical flow with a flow encoder;
- generating an object mask for the current query frame comprises decoding a bilateral transformation; and
- generating the bilateral transformation comprises combining the bilateral attention and a cross-attention that is based on the query encoding and the memory encoding.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
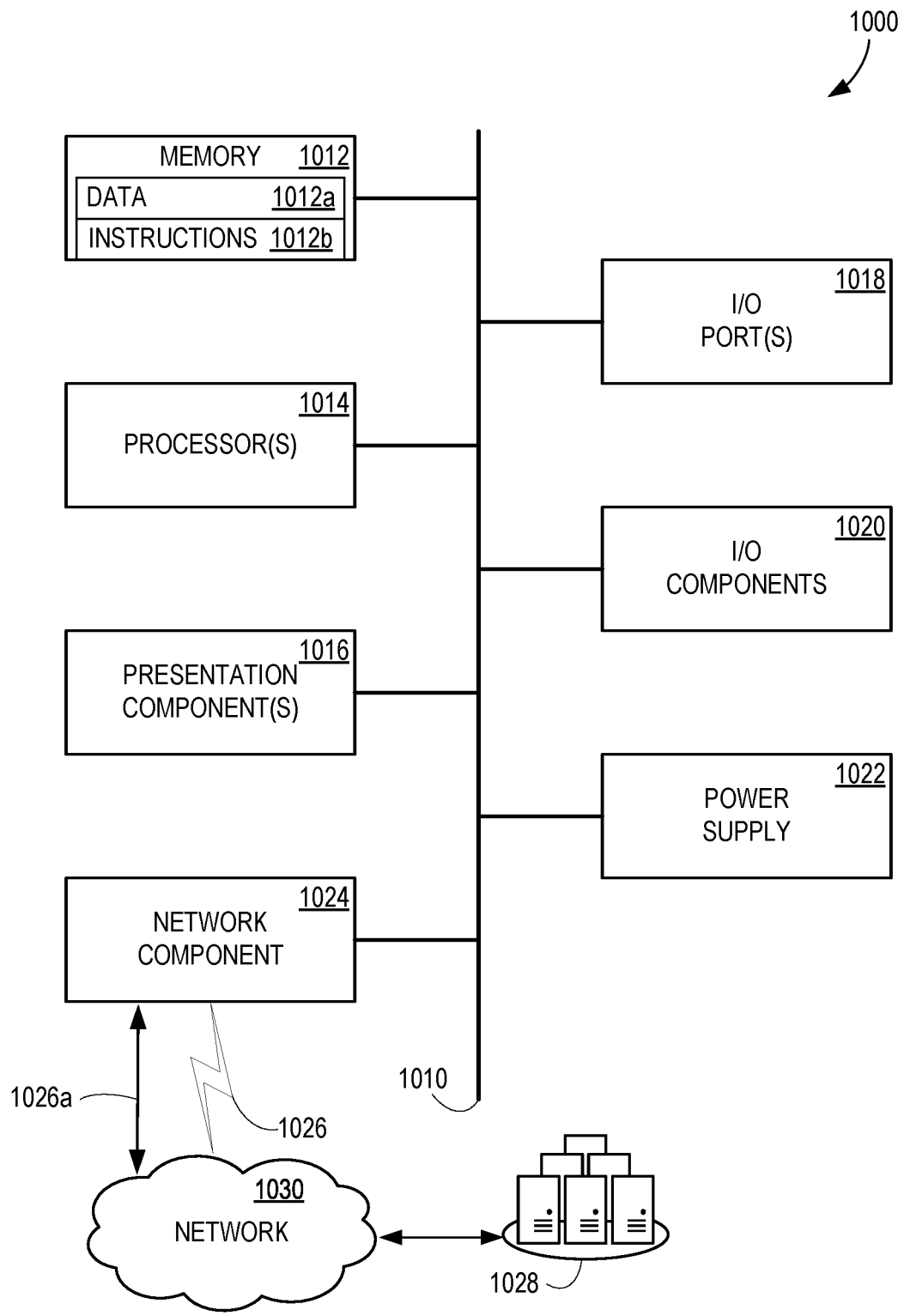
FIG. 10 shows a block diagram of an example computing device suitable for implementing some of the various examples disclosed herein.

FIG. 10 is a block diagram of an example computing device 1000 (e.g., a computer storage device) for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer storage media referenced below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer storage media. Memory 1012 may include any quantity of memory associated with or accessible by the computing device 1000. Memory 1012 may be internal to the computing device 1000 (as shown in FIG. 10), external to the computing device 1000 (not shown), or both (not shown). Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth branded communications, or the like), or a combination thereof. Network component 1024 communicates over wireless communication link 1026 and/or a wired communication link 1026a to a remote resource 1028 (e.g., a cloud resource) across network 1030. Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   receive a video stream comprising a plurality of video frames in a sequence;
   receive a first object mask for an initial video frame of the plurality of video frames;
   select a video frame of the plurality of video frames as a current query frame, the current query frame following, in the sequence, a reference frame of a reference frame set, wherein each reference frame has a corresponding object mask;
   using the current query frame and a video frame in the reference frame set, determine a bilateral attention, wherein determining the bilateral attention comprises computing an attention between one or more query features and one more memory features in a bilateral space of motion and appearance; and
   using the bilateral attention, generate an object mask for the current query frame.

2. The system of claim 1, wherein the instructions are further operative to:
   generate a series of object masks corresponding to video frames of the plurality of video frames, wherein each object mask in the series of object masks corresponds to a common object that appears within the video stream, and wherein generating the series of object masks comprises:
   set, in turn, a video frame of the plurality of video frames, after the initial video frame in the sequence, as the current query frame;
   after generating the object mask for the current query frame, add the current query frame to the reference frame set; and
   set a video frame of the plurality of video frames, after the current query frame in the sequence, as a subsequent query frame.

3. The system of claim 2, wherein the instructions are further operative to:
   using the series of object masks, perform, for the video stream, a video object segmentation (VOS) task selected from the list consisting of:
   targeted content replacement, content moderation, and object labeling.

4. The system of claim 1, wherein determining the bilateral attention comprises:
   using the reference frame set, determining a memory encoding; and
   using a calibrated optical flow and query features, determining a bilateral space encoding.

5. The system of claim 4, wherein the instructions are further operative to:
   generate the calibrated optical flow, wherein generating the calibrated optical flow comprises:
   fuse an object mask corresponding to a video frame preceding the current query frame with an initial optical flow estimation between the current query frame and the video frame preceding the current query frame.

6. The system of claim 1, wherein the bilateral attention comprises a function of query tokens, key tokens, value tokens, and a bilateral space binary mask.

7. A computerized method comprising:
   receiving a video stream comprising a plurality of video frames in a sequence;
   receiving a first object mask for an initial video frame of the plurality of video frames;
   selecting a video frame of the plurality of video frames as a current query frame, the current query frame following, in the sequence, a reference frame of a reference frame set, wherein each reference frame has a corresponding object mask;
   using the current query frame and a video frame in the reference frame set and also using a memory encoding, determining a bilateral attention, wherein determining the bilateral attention comprises computing an attention between one or more query features and one more memory features in a bilateral space of motion and appearance; and
   using the bilateral attention, generating an object mask for the current query frame.

8. The method of claim 7, further comprising:
generating a series of object masks corresponding to video frames of the plurality of video frames, wherein each object mask in the series of object masks corresponds to a common object that appears within the video stream, and wherein generating the series of object masks comprises:
setting, in turn, a video frame of the plurality of video frames, after the initial video frame in the sequence, as the current query frame;
after generating the object mask for the current query frame, adding the current query frame to the reference frame set; and
setting a video frame of the plurality of video frames, after the current query frame in the sequence, as a subsequent query frame.

9. The method of claim 8, further comprising:
using the series of object masks, performing, for the video stream, a video object segmentation (VOS) task selected from the list consisting of:
targeted content replacement, content moderation, and object labeling.

10. The method of claim 7, wherein determining the bilateral attention comprises:
using the reference frame set, determining a memory encoding; and
using a calibrated optical flow and query features, determining a bilateral space encoding.

11. The method of claim 10, further comprising:
generating the calibrated optical flow, wherein generating the calibrated optical flow comprises:
fusing an object mask corresponding to a video frame preceding the current query frame with an initial optical flow estimation between the current query frame and the video frame preceding the current query frame.

12. The method of claim 7, wherein the bilateral attention comprises a function of query tokens, key tokens, value tokens, and a bilateral space binary mask.

13. One or more computer storage devices having computer-executable instructions thereon, that when executed by at least one processor, cause the at least one processor to perform operations comprising:
receiving a video stream comprising a plurality of video frames in a sequence;
receiving a first object mask for an initial video frame of the plurality of video frames;
selecting a video frame of the plurality of video frames as a current query frame, the current query frame following, in the sequence, a reference frame of a reference frame set, wherein each reference frame has a corresponding object mask;
using the current query frame and a video frame in the reference frame set and also using a memory encoding, determining a bilateral attention, wherein determining the bilateral attention comprises computing an attention between one or more query features and one more memory features in a bilateral space of motion and appearance; and
using the bilateral attention, generating an object mask for the current query frame.

14. The one or more computer storage devices of claim 13, wherein the operations further comprise:
generating a series of object masks corresponding to video frames of the plurality of video frames, wherein each object mask in the series of object masks corresponds to a common object that appears within the video stream, and wherein generating the series of object masks comprises:
setting, in turn, a video frame of the plurality of video frames, after the initial video frame in the sequence, as the current query frame;
after generating the object mask for the current query frame, adding the current query frame to the reference frame set; and
setting a video frame of the plurality of video frames, after the current query frame in the sequence, as a subsequent query frame.

15. The one or more computer storage devices of claim 14, wherein the operations further comprise:
using the series of object masks, performing, for the video stream, a video object segmentation (VOS) task selected from the list consisting of:
targeted content replacement, content moderation, and object labeling.

16. The one or more computer storage devices of claim 13, wherein determining the bilateral attention comprises:
using the reference frame set, determining a memory encoding; and
using a calibrated optical flow and query features, determining a bilateral space encoding.

17. The one or more computer storage devices of claim 16, wherein the operations further comprise:
generating the calibrated optical flow, wherein generating the calibrated optical flow comprises:
fusing an object mask corresponding to a video frame preceding the current query frame with an initial optical flow estimation between the current query frame and the video frame preceding the current query frame.

* * * * *